United States Patent [19]

Badoureaux

[11] Patent Number: 4,702,278

[45] Date of Patent: Oct. 27, 1987

[54] VALVE COUPLERS DESIGNED TO ALLOW THEIR CONNECTION DESPITE THE PRESENCE OF CONSIDERABLE RESIDUAL PRESSURE IN USER LINES

[75] Inventor: Jean-Pierre Badoureaux, Annemasse, France

[73] Assignee: Parker Hannifin Corporation, Cleveland, Ohio

[21] Appl. No.: 866,023

[22] Filed: May 21, 1986

[30] Foreign Application Priority Data

May 21, 1985 [FR] France .................. 85 07821

[51] Int. Cl.$^4$ .......................................... F16L 37/28
[52] U.S. Cl. .................. 137/614.05; 137/614; 251/149.6
[58] Field of Search .............. 137/614, 614.05; 251/149.6

[56] References Cited

U.S. PATENT DOCUMENTS

| | | | |
|---|---|---|---|
| 3,791,411 | 2/1974 | Bogeskov et al. | 137/614.02 |
| 4,200,121 | 4/1980 | Walter et al. | 137/614.05 |
| 4,288,113 | 9/1981 | Saulnier | 285/238 |
| 4,394,874 | 7/1983 | Walter | 137/614.02 |
| 4,398,561 | 8/1983 | Maldavs | 137/614.05 |

FOREIGN PATENT DOCUMENTS 3238410 10/1983 Fed. Rep. of Germany .

*Primary Examiner*—A. Michael Chambers
*Attorney, Agent, or Firm*—Christopher H. Morgan

[57] ABSTRACT

A coupling device for receiving and retaining a coupling piece allowing coupling with pressure in the piece coupled while also providing flow checking to prevent unintended closing of the coupled valves. The device includes first and second joined tubular pieces axially movable with respect to each other between a receiving position for receiving a coupling piece and a retaining position for retaining a coupling piece. A valve is movable in the coupling piece between a closed position, an open position and a position past open allowing coupling to a coupling piece with fluid pressure therein. A stop is responsive to the receiving and retaining positions of the tubular pieces so that only when the pieces are in a receiving position can the valve move from an open position to a position past open. The stop is preferably a shoulder on a stem of the valve which engages the leading edge of a collet actuated by a sleeve. The sleeve is disposed between the valve stem and the second tubular piece.

11 Claims, 4 Drawing Figures

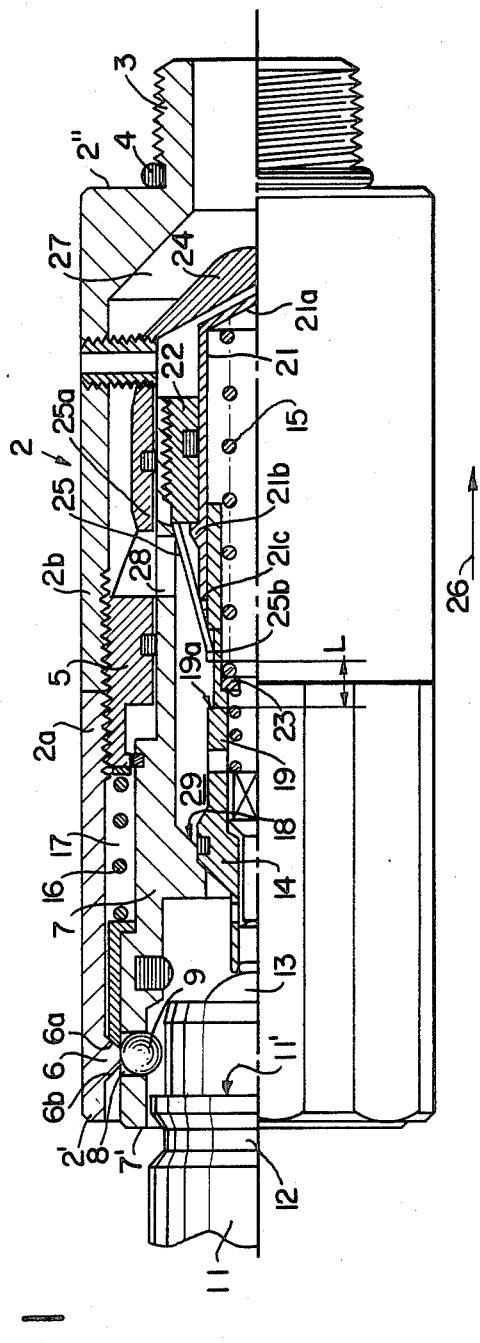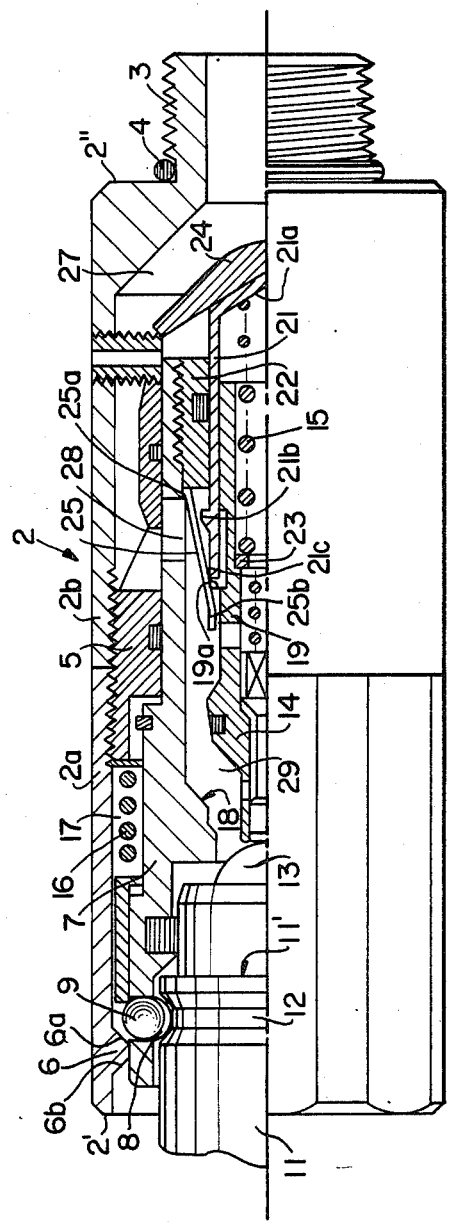

VALVE COUPLERS DESIGNED TO ALLOW THEIR CONNECTION DESPITE THE PRESENCE OF CONSIDERABLE RESIDUAL PRESSURE IN USER LINES

BACKGROUND OF THE INVENTION

The subject of this invention is an improvement for valve couplers designed to allow their connection despite the presence of considerable residual pressure in user lines.

The invention thus concerns the type of valve coupler comprising an outside tubular body, one end of which is provided with a solid coupling means to a sorucе of fluid under pressure and which accommodates a tubular element free to move axially in both directions, whereby the rear end of the outside tubular element which matches the free end of the tubular valve body and comprises the female fitting of the coupler, accommodates the locking balls which are housed in an annular row of holes, whereby the balls are intended to be engaged in and located by an external annular groove provided for this purpose adjacent to the end of the male coupler fitting, whereby a spring acts to return this tubular element to a stable intermediate position in which the annular row of holes in which the locking balls are housed coincides in an axial plane with a radial internal rib with tapered faces provided in the tubular valve body in order to maintain the balls in their locking position, that is to say in a position in which they project radially inside the bore in the mobile tubular element, whereby the latter is provided with a valve towards its rear end, which is normally maintained in a closed position by means of a spring and is designed to be withdrawn to an open position by the valve of the male fitting whenever the latter is inserted in the female fitting.

In this type of coupler, each valve is associated with a return spring and a stop limiting the valve stroke which essentially corresponds to the half of the travel of the male fitting during insertion in the female fitting, which acts to maintain the two valves open by allowing them to bear on one another as long as the two fittings are connected.

With couplers of this type, if a considerable level of residual pressure is still present in the user lines, of the order of 200 bars, for example, the two valves simply cannot be allowed to open simultaneously before the male fitting is locked in position. However, the male fitting can usually only be locked after the two valves are fully open.

One solution is to provide the valve located on the supply side with a stroke double that of the valve on the user side, whereby the latter would open as soon as the supply pressure exceeds the residual pressure in the user line. However, if a flow reversal were to occur during operation and a high viscosity hydraulic coil were to be used, there would be a risk of forcing the valve located on the user side to close and to remain firmly closed as a result of the pressure balance prevailing on its two sides.

Attempts have been made to deal with this disadvantage by doubling the opening stroke of the valve located on the supply side, on the one hand and by preventing the valve on the user side from returning to its closed position at all, until the coupler is disconnected.

French document No. 2,384,196 provides a description of a coupling of this type where the stroke stop associated with the valve on the supply side is arranged so that it goes into a holding mode prior to being locked in position after a single opening stroke, whereby it is locked in a position in which it is limited to a single opening stroke and to a single operation by the return of the valve to a position corresponding to a single stroke and is maintained in a retracted position allowing the valve to travel twice its normal stroke as soon as the two coupling elements are uncoupled.

In this coupling, the stroke stop associated with the valve on the supply side comprises a pin housed in the valve body of the corresponding element of the coupling, which is actuated by a radial spring in the direction of the stem of the valve, wherby the rear end of the valve stem is narrower and the inside shoulder of the narrower part of this valve stem is designed to contact the aforesaid actuating pin in order to limit the opening stroke of the valve to a single stroke length. In order to allow the valve to perform a double opening stroke whenever the two coupling elements are connected to one another, the narrower rear end of the valve stem is provided with a cylindrical collar whose outside diameter slightly exceeds the larger diameter of the valve stem, the end of which facing the valve itself is truncated.

In this way, as soon as the male fitting engages in the female fitting of this coupler, only the valve on the supply side is brought to an open position and it is retracted beyond its normal opening stroke by the valve on the user side, since its normal stroke stop is in its retracted position.

Following this, when the supply line is opened, the supply pressure which exceeds the residual pressure remaining in the supply line, will act to open the valve on the user side, normal flow will occur and the stroke stop associated with the valve on the supply side will be returned to its active position, whereby the return spring in this valve will return the latter to its normal opening position, that is to say, resting against its stroke stop.

However, satisfactory operation of this valve requires that the friction forces between the collar and the radial actuating pin, exceed the forces arising between the collar and the narrower diameter of the valve stem, since, if this were not the case, the valve would be entirely unable to perform a double stroke. It is easy to imagine that the wear resulting from repeated coupling and uncoupling operations would be sufficient to reverse the relation between the aforesaid frictional forces and thus render the retractable actuating pin inoperative.

SUMMARY OF THE INVENTION

The purpose of the present invention is to eliminate any risk of malfunction on the part of this coupling. For this purpose, the rear end of the stem of the valve on the supply side of a coupling of the aforesaid type is housed in a retractable sleeve which is tightly sealed and supported in a hub provided at the rear end of the mobile tubular element, whereby the reverse stroke of this sleeve is limited by a rear stop to a value less than the stroke of the tubular element itself and on the other hand, the opening stroke stop of this valve is formed by a truncated annular collet which is retained by fastening its rigid rear end of larger diameter to the internal wall of the mobile tubular element and whose narrower front diameter, which is elastic and stretchable, is normally simultaneously applied to the leading edge of the retractable sleeve surrounding the valve stem, on the one hand, and to the external cylindrical wall of the same valve stem, behind a rear-facing shoulder provided on the valve stem, on the other hand.

Consequently, when the tubular element retracts into the body of this coupler as a result of insertion of the male fitting in the female fitting, the retractable sleeve will be stopped by its stroke stop, whereas the mobile tubular element and its associated valve will continue their stroke, thus forcing the collet to engage in the front end of the retractable sleeve, which will in turn cause the sleeve to open and allow the valve stem shoulder to pass, as result of which the valve stem will be able to perform a stroke which is longer than normal and which is in fact a double stroke.

It will be readily understood that, when the supply line is open, as soon as the male fitting is locked in the female fitting, under the influence of the supply pressure which will be higher than the residual pressure remining in the user line, the valve in the male fitting will open. Normal flow will then pass through the coupling, from the supply side to the user side and since the valve on the user side will no longer exert any force on the valve on the supply side, the return spring of the latter will bring the valve on the supply side to bear on the other valve and in this position, the valve stem shoulder will again pass in front of the narrow diameter end of the collet. At the same time, the very short return stroke of the mobile tubular element will be sufficient to disengage the collet from the retractable sleeve and to allow it to return to its active position.

Consequently, even if flow reversal occurs, the valve on the user side will no longer be able to close as long as the two coupler fittings remain connected to one another.

BRIEF DESCRIPTION OF THE DRAWINGS

FIG. 1 shows a lateral view of an axial half-section showing the start of engagment of the male fitting in the female fitting, whereby the female fitting is still in its normal resting position and both valves are closed;

FIG. 2 is a similar view to FIG. 1 and shows the coupler at the end of insertion of the male fitting in the female fitting, just before it is locked in the female fitting;

DETAILED DESCRIPTION OF THE INVENTION

Figure 3:
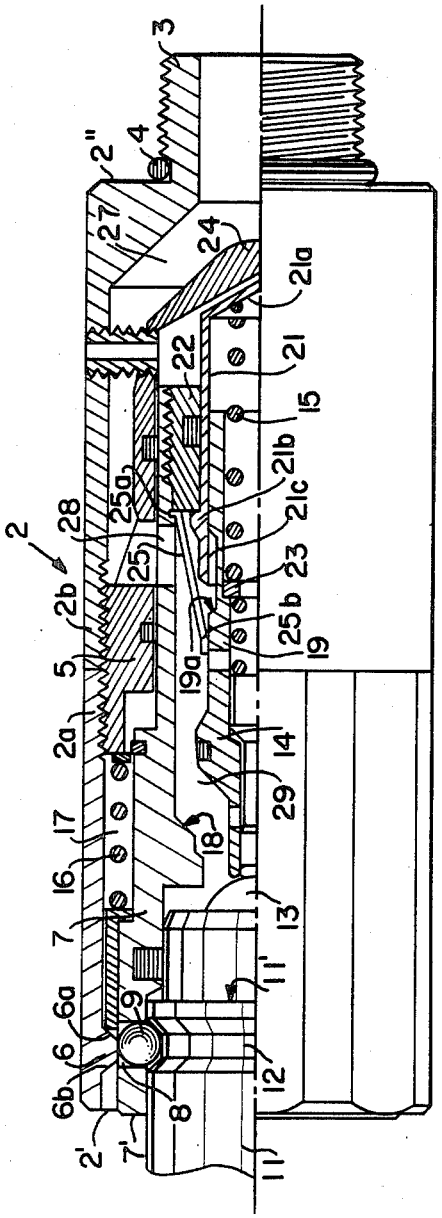
FIG. 3 provides similar view to FIGS. 1 and 2 and shows the male and female coupler fittings locked together, before the supply line is opened.

As shown here, the coupler to which the improvement which is the subject of the present invention is applied, is a valve coupler of known type, comprising an external tubular valve body (2) provided with a threaded fitting (3) at its read end (2") and with an O-ring (4) to provide a tight seal between the coupler and a source of pressurized fluid, which is not shown here.

In the example shown in the drawing, for ease of mounting the tubular valve body (2) consists in fact of two coaxial elements, one towards the front (2a) and the other towards the rear (2b), assembled end-to-end with threaded collar (5).

Adjacent to its front end (2'), the tubular valve body (2) is provided with an internal radial rib (6) with one internal and one external tapered face (6a, 6b respectively), whose function will be explained below.

Inside the valve body (2), an internal tubular element (7) is provided which can move in either axial direction and whose front end (7'), which matches the front end (2') of the valve body (2), comprises the female coupler fitting and supports the locking balls (9) which are housed in an annular row of holes (8), whereby these balls are normally maintained so as to project radially inside the bore of the front end (7') of the tubular element (7) by means of the rib (6) in the valve body (2), the diameter of the balls (9) being greater than the thickness of the wall of the tubular element (7) adjacent to the annular row of holes (8). It should be noted that the internal radial end of each hole (8) is provided with a narrow section preventing the balls (9) from passing freely. The function of these balls is to provide a known means of locking the male fitting (11) of this coupler, which can be seen in FIGS. 2–4, by engaging the male fitting (11) in an external peripheral groove (12) provided near its free end.

Both the male fitting (11) and the female fitting (7') of this coupler are associated with valves (13, 14 respectively), which are normally kept closed by means of return springs. In the drawing, only the return spring (15) of the valve (14) associated with the female fitting (7') is shown. Each of these valves (13, 14) is designed to bear on one another when the male fitting (11) is being inserted in the female fitting (7'), so that the valves are opened and remain open as long as the male fitting (11) remains inserted in the female fitting (7').

Figure 4:
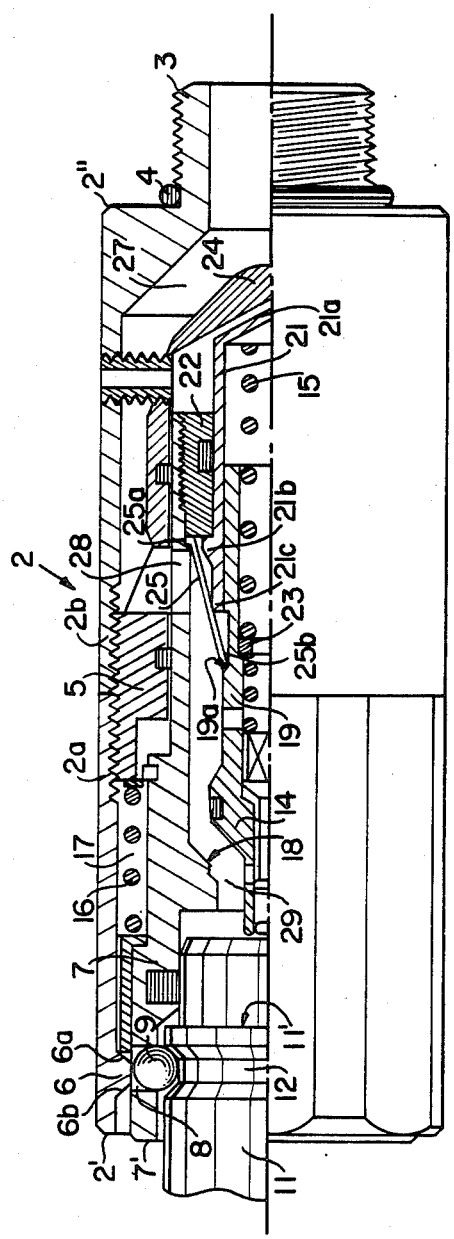
FIG. 4 shows a similar view to FIGS. 1-3, with the coupler in operation.

As shown in FIGS. 1, 2 and 4, a spring (16) surrounding the mobile tubular element (7) and which is thus accommodated in the annular space between the tubular element (7) and the valve body (2), tends to maintain the former in a stable intermediate position in which the annular rows of holes (8) coincide axially with the rib (6) and consequently in this position the balls (9) are maintained by the rib (6) in an internal radial locking condition.

For this purpose, the return spring (16) bears on two pairs of shoulders equidistant from one another, whereby one pair of shoulders is provided on the external cylindrical face of the mobile tubular element (7), whereas the other pair of shoulders is provided on the internal cylindrical face of the tubular valve body (2).

Each valve (13, 14) is associated with a opening stroke stop, which is roughly equal to one half of the stroke covered by the male fitting (11) in the female fitting (7') after the instant when the two valves (13, 14) enter into contact with one another, as shown in FIG. 1. In this position, both valves, (13, 14) are still closed. The purpose of the two aforesaid stroke stops is obviously to provide a mechanical means of insuring that both the valves (13, 14) are maintained in the open position when the male fitting (11) is fully engaged and locked in the femal fitting (7'), as shown in FIG. 4.

The stroke stop associated with the valve (13) on the user side is not shown in this drawing.

As shown in the drawing, the valve (14) on the supply side and whose stem is arranged in the bore of the mobile tubular element (7), is provided with a stem (19) which is mounted retractably on a rear sleeve (21), which itself is mounted so as to be able to slide in an axial direction on a collar (22) screwed in the bore of the tubular element (7) for which it forms a hub. As shown in the drawing, the stem (19) of the valve (14) is tubular and spring (15) which is compressed between the bottom (21a) of the sleeve (21) and an internal shoulder (23) provided as a stop in the bore of the stem (19), will continually tend to try and return the valve (14) to its closed position, as shown in FIG. 1.

A fixed rear stop (24) mounted on the valve body (2), limits the return stroke of the sleeve to below the value of the return stroke of the mobile tubular element (7).

On the other hand, an external shoulder (21b) of the sleeve (21) bears on the front face of the collar (22) which serves as its hub and prevents the bottom (21a) of the sleeve (21) from touching its stop (24).

In the example shown in the drawing, the retractable stop which limits the opening stroke of the valve (14) is formed by a truncated annular collet (25), whose rear end, which is of large diameter, is fastened to the internal wall of the mobile tubular element (7).

In the example shown in the drawing, this fastening consists of a flange arranged at this end of the collet (25) located between the internal shoulder of the bore in the tubular body (7) and the front end of the collar (22) which serves as the hub of the sleeve (21). The elastic, stretchable front end of narrower diameter is normally applied against the leading edge (21c) of the sleeve (21) and at the same time against the external cylindrical wall of the stem (19) of the valve (14). In addition, when the tubular element (7) is at rest and the valve (14) is closed, as shown in drawing 1, the leading small diameter end (25b) of the truncated collet (25) comes to bear behind the shoulder (19a) facing the rear of the stem (19) of valve (14). It will be easily understood that the travel of the valve (14) and of the valve stem (19) on the return stroke equals the length L corresponding to the distance between the shoulder (19a), in the position illustrated in FIG. 1, and the narrow diameter end (25b) of the collet (25) will bring the shoulder (19a) and the narrow diameter end (25b) of the collet (25) into contact with one another and thus limit the opening stroke of the valve (14) to the aforesaid length (L).

As stated above, the stop formed by the leading edge (25b) of the collet (25) is arranged so as to retract as soon as the male fitting (11) engages in the female fitting (7') and it will return to its active position as soon as the male fitting (11) is locked in the female fitting (7') by the balls (9) falling in the groove (12), following which the supply line is open and the pressurized fluid flows into the coupler through the bore in its threaded connection (3).

This stop operates as follows:

If the user continues to insert the male fitting (11) in the female fitting (7') beyond the position illustrated in FIG. 1 at which the valves (13, 14) enter into contact with one another, the residual pressure in the user line assists the action of the return spring of valve (13), allowing the latter to cause valve (14) to open, without opening itself, whereby the force exerted by the return of valve (14) is not greater than that exerted by the spring of valve (13). During this phase, a leading shoulder (11') in the male fitting (11), of the same diameter as the bore in the female fitting (7'), causes the mobile tubular element (7) to return in the direction of the arrow (26) by bearing on the balls (9) which are prevented from retracting on account of the rib (6) in the valve body (2). This return stroke of the tubular element (7) under the force exerted by the spring (16) under compression has the effect of shifting the row of holes (8) inside the valve body (2) with respect to the rib (6), as a result of which the balls (9) are able to retract and clear the bore of the female fitting (7'), as they are dispersed radially outwards, as shown in FIG. 3. As the balls retract, they allow the male fitting (11) to engage in the female fitting (7') until the groove in the male fitting (11) is located above the annular row of balls (9).

As can be seen from an examination of FIG. 2, the stroke of the sleeve (21) in the direction of the arrow (26) is stopped by the fixed stop (24) before the mobile tubular (7) element has ended its own stroke. As a result, the collar (22) slides over the sleeve (21) in the direction of arrow (26), whereby the collar entrains the collet (25) and consequently the end (25b) of the collet as well which serves as its stop. As it slides over the leading edge (21c) of the sleeve (21) which is held in place by the stop (24), the leading edge (25b) of the collet (25) stretches until it reaches the position shown in FIG. 2, at which point the diameter of the leading end (25b) of the collet (25) exceeds the larger diameter of the shoulder (19a). As a result, the shoulder (19a) is easily able to pass into the collet (25), since it is able to clear the stop formed by its leading end (25b).

The result is that the male fitting (11) can be fully inserted in the female fitting (7') without the valve (14) located on the user side being open. In this position, the male fitting (11) will be locked in the female fitting (7') by the balls (9) as they fall into the groove (12).

When the supply line is open, the fluid supply flows into the coupler through the core in its threaded connection (3) and by the orifice arranged in the valve body (2) as well as the radial orifice (28) in the mobile tubular element (7') as far as the bore (29) in the tubular element (7) whose leading end is cleared by the valve (14). Since the pressure of the fluid supply exceeds the residual pressure in the user line, the valve (13) on the user side will be open, which frees the valve (14) entirely since, at this point, the pressurized fluid can flow freely from the supply line to the user line. The return spring (15) of the valve (14) is thus free to return the latter to its advanced position in which it will bear against the valve (13), whereby the latter bears on its opening stoke limit stop, which is not shown in the drawing.

In this position, which is shown in FIG. 4, the shoulder (19a) of the stem (19) of the valve (14) passes below the leading edge (25b) of the collet (25), thus enabling it to resume its function as the opening stroke limit stop of valve (14).

In this way, valve (13) will no longer be able to open accidentally as the result of possible flow reversal and this stop will remain in an active position as long as the male fitting (11) remains connected to the female fitting (7') and until a new connection is restored.

It has been stated above that one end of the truncated collet (25) was of smaller diameter (25b) and that this diameter could be extended. This function is easily obtained by cutting longitudinal slits in the truncated wall of the collet, thus creating longitudinal louvers which are maintained in their normal position by the elasticity of the material of the collet, which may be made of metal, plastic or any other suitable material.

I claim:

1. A coupling device for releasably receiving and retaining a coupling piece, comprising:
   first and second sealingly joined tubular pieces, together forming a coupling body, and axially movable relative to each other between a receiving position allowing a coupling piece to be received therein and a retaining position for retaining a coupling piece therein;

a valve axially movable in said second tubular piece between a closed position preventing fluid flow through said coupling body, an open position allowing fluid flow through said coupling body, and a position past said open position allowing sealed coupling to a coupling piece with fluid pressure therein, said valve having a valve stop thereon;

said second tubular piece having a stop mate which selectively mates with said valve stop to prevent said valve from moving past said open position; and stop selector means cooperating with said valve stop and said stop mate responsive to the relative position of said first and second tubular pieces for selectively preventing said valve from moving to said position past said open position such that when said first and second tubular pieces are in said receiving position said valve is free to move to said position past said open position, while when said first and second tubular pieces are in said retaining position, said valve is prevented from moving to said position past said open position.

2. The device of claim 1 wherein said valve stop comprises:

a valve stem extending axially from said valve and having an annular stop shoulder thereon; said stop mates comprises:

a collet connected to said second tubular piece and having a leading edge capable of contracting and expanding so as to engage and not engage said stop shoulder when said valve is in said open position; and said stop selector means comprises:

a sleeve disposed between said second tubular piece and said valve stem, said sleeve having a portion capable of encountering said collet for the operation of expanding and contracting said leading edge of said collet.

3. The device of claim 2 wherein said first and second tubular pieces form a female receptacle for a male coupling piece and have a set of locking balls capable of moving to a radially inward position to be received in a groove of a male coupling piece, said locking balls being held in the radially inward position by said first and second tubular pieces when said first and second tubular pieces are in said retaining position.

4. The device of claim 3 wherein said second tubular piece is joined with said first tubular piece to move axially inwardly in moving to said receiving position and wherein said first tubular piece has a sleeve stop connected thereto which encounters said sleeve as said second tubular piece moves axially inwardly causing said sleeve to encounter said collet and to expand said leading edge of said collet so as to allow said valve to move to said position past said open position.

5. A coupling device for releasably receiving and retaining a coupling piece, comprising:

first and second sealingly joined tubular pieces, together forming a coupling body, and axially movable relative to each other between a receiving position allowing a coupling piece to be received therein and a retaining position for retaining a coupling piece therein;

a valve axially movable in said second tubular piece between a closed position preventing fluid flow through said coupling body, an open position allowing fluid flow through said coupling body, and a position past said open position allowing sealed coupling to a coupling piece with fluid pressure therein;

said valve having a valve stem with a stop thereon;

a stop mate carried by said second tubular piece and movable with respect to said stop between (1) a catch position in which said stop mate engages said stop with said valve in said open position thereby preventing movement of said valve past said open position, and (2) a non-catch position in which said stop mate does not engage said stop so that said valve can move past said open position; and a sleeve axially movable with respect to said second tubular piece to operate said stop mate and said stop between said catch position and said non-catch position responsive to the relative position of said first tubular piece and said second tubular piece such that when said first and second tubular pieces are in said receiving position said stop mate and said stop are in said non-catch position while when said first and second tubular pieces are in said retaining position said stop mate and said stop are in said catch position.

6. The device of claim 5 wherein said stop mate comprises a collet extending from said second tubular piece to said valve stem and expandable about said valve stem responsive to said sleeve, and wherein said stop comprises an annular shoulder extending about said valve stem.

7. The device of claim 5 wherein said first tubular piece comprises a housing, one end of which is threaded for fixed connection to a fluid conduit and the other end of which receives a coupling piece.

8. The device of claim 7 wherein said second tubular piece comprises a female fitting for receiving the male end of a coupling piece.

9. The device of claim 5 wherein said sleeve has a first end extending about said valve stem and within said second tubular piece, and a second end engageable with said first tubular piece.

10. The device of claim 9 wherein said stop mate comprises a collet, a radially outer end of which is fixedly connected to said second tubular piece and a radially inner end of which extends about said valve stem, said radially inner end of said collet being expandable by said sleeve between said catch position and said non-catch position; and wherein said stop comprises an annular shoulder extending about said valve stem and engageable with said collet.

11. The device of claim 10 which further comprises a sleeve spring which urges said sleeve away from the radially inner end of said collet.

* * * * *